Sept. 20, 1932. M. L. ROSENFELD ET AL 1,877,976
SAFETY STOP FOR MOTOR VEHICLES
Filed Feb. 19, 1930 2 Sheets-Sheet 2

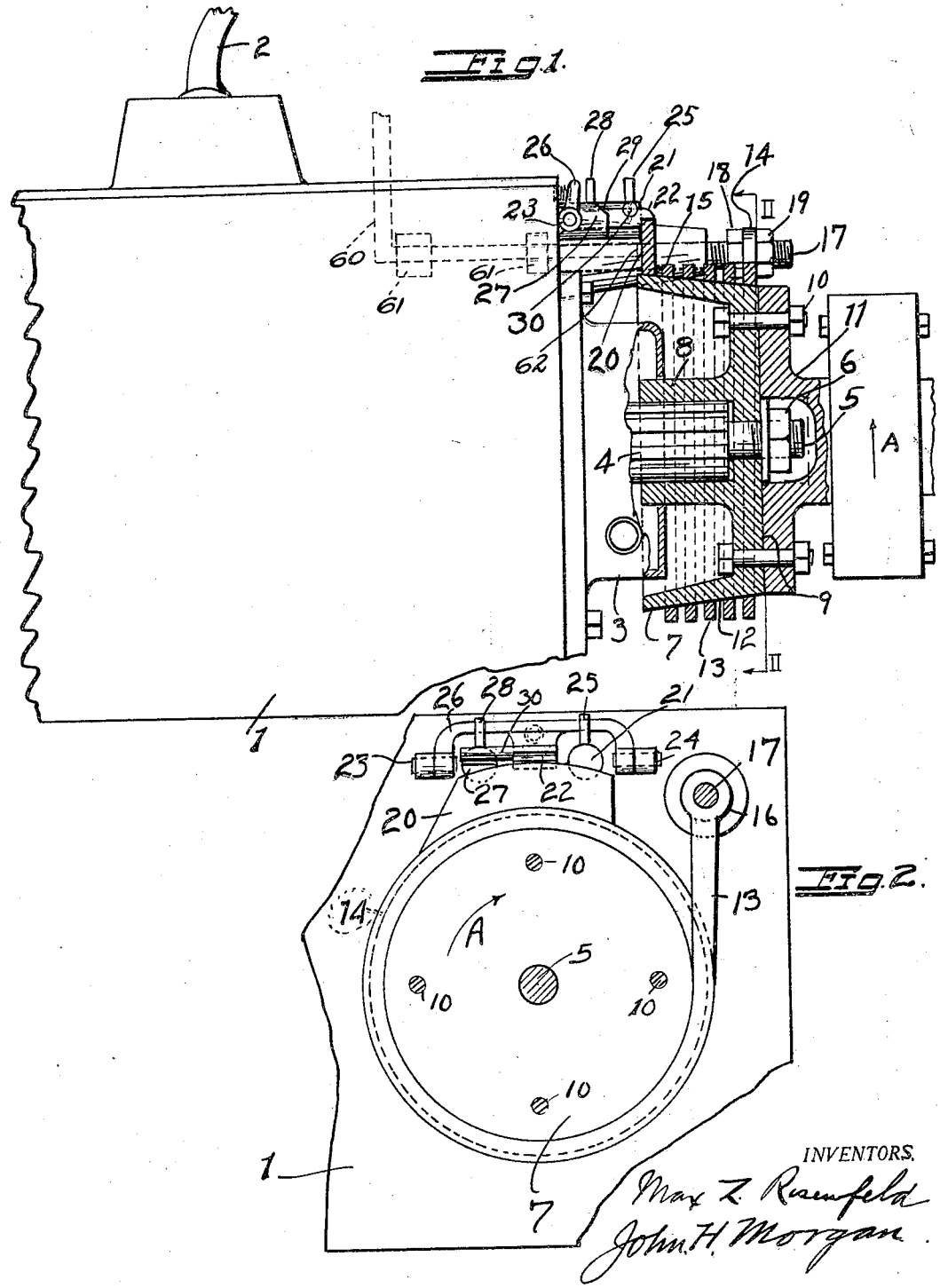

INVENTORS.
Max L. Rosenfeld.
John H. Morgan.

Patented Sept. 20, 1932

1,877,976

UNITED STATES PATENT OFFICE

MAX L. ROSENFELD AND JOHN H. MORGAN, OF SAN FRANCISCO, CALIFORNIA; SAID MORGAN ASSIGNOR TO SAID ROSENFELD

SAFETY STOP FOR MOTOR VEHICLES

Application filed February 19, 1930. Serial No. 429,566.

Our invention relates to improvements in safety stops for motor vehicles, and more particularly to automatic reverse safety stops to prevent motor vehicles from accidently running backwards down a hill on which the vehicle has been parked regardless of whether the brakes have been set or not, and an object of the invention is to provide a stop which will at all times be effective to prevent the backing of the vehicle, but when it is desired to back up the stop is made inoperative by the action of the reverse mechanism.

Another object is to provide a stop that after it has been made inoperative by the reverse mechanism it will still be inoperative in the neutral position of the gear shift, thereby allowing the vehicle to be pushed in either direction on the garage floor or for other reasons.

Another object is to provide a safety stop that is set for safety action by the gear shift mechanism on any forward speed.

Another object is to provide means for easier operation by the driver of a vehicle when on a steep grade.

A further object is to provide an automatic stop construction that will be very simple and consist of few parts readily attached to the present types of transmissions.

Other objects will appear as the description proceeds.

An embodiment of the invention is shown in the accompanying drawings in which the same reference numeral is applied to the same portion throughout the several views, and of which there may be modifications.

Figure 1 is a side elevation of a portion of an automobile transmission box showing the safety stop mechanism in section.

Figure 2 is a section on line 2—2 of Figure 1.

Figures 3, 4:
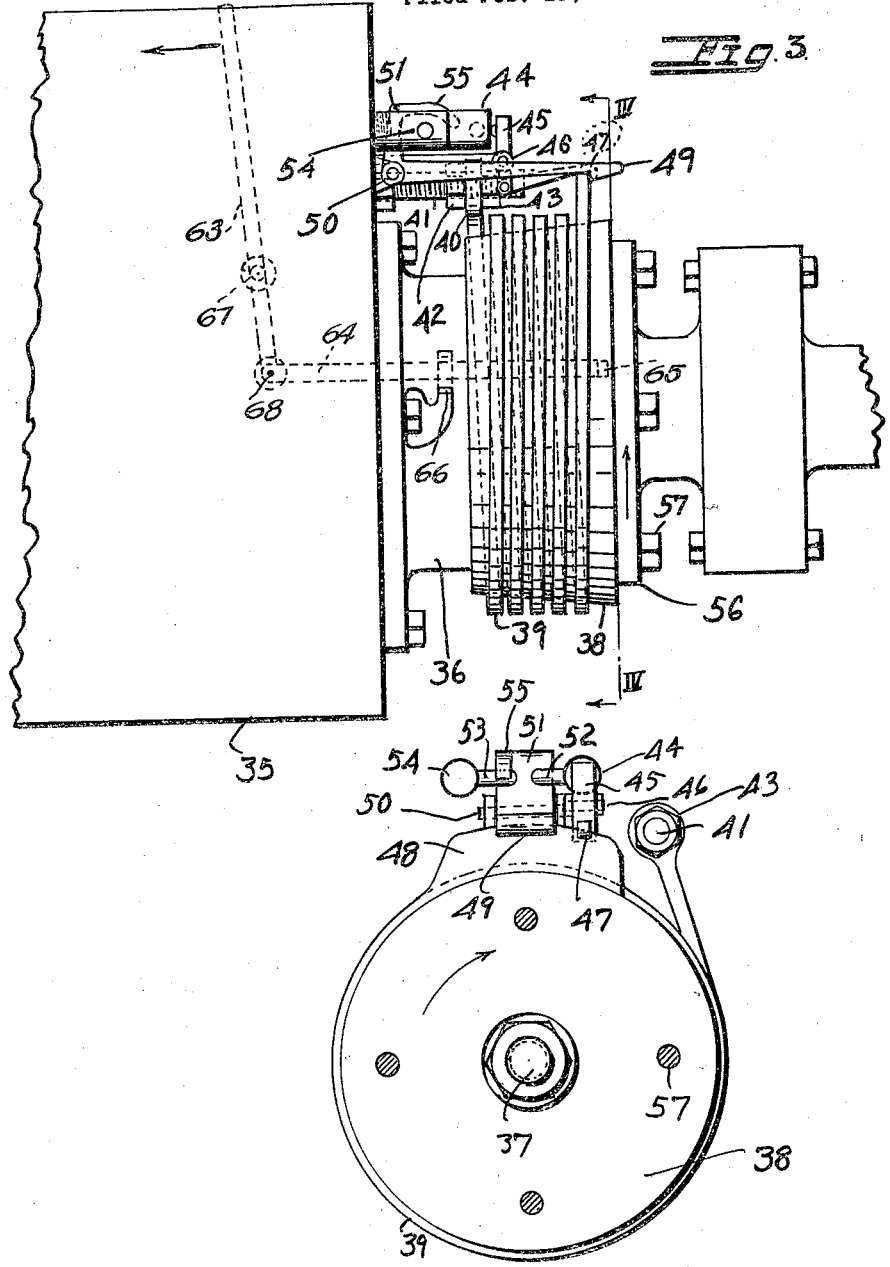
Figure 3 shows a slightly modified form of the device attached to a portion of the transmission box.
Figure 4 is a view taken on line 4—4 of Figure 3.

The numeral 1 indicates a transmission box and 2 a portion of a gear shift lever. 3 indicates the housing for the speedometer which is shown to illustrate how our attachment does not interfere with present construction of transmissions and fittings, 4 indicates the end portion of the main gear shaft which has the reduced threaded member 5 and nut 6.

Mounted on the shaft 4 is the taper drum 7, the hub 8 of which fits over the shaft, and the face flange 9 forms one member of the universal joint coupling 11 and is bolted in place by the bolts 10. The taper face 12 forms an element of the safety stop. On the taper face is a spiral spring 13 preferably turned out on the inside to fit the taper of the face 12, the outside diameter of the coil being the same dimension throughout in this instance but may be modified in various ways.

In the form of spring as shown the thickness of the metal varies from the outside end 14 to the inside end 15.

The outside end is fixed by means of an eye 16 and the threaded bolt 17, and is held in an adjusted position by the nuts 18 and 19. The purpose of the adjustment is to place more or less pressure of the spring on the taper.

The other end of the spring coil is free, and it has a thin lug 20 which is adapted to be engaged by the shift rod 21 when it is in the reverse position to push back on the coils to free their inner surface from the taper face 12 of the drum 7.

To hold the coil spring in the inoperative position a dog 22 is pivoted at 23 and 24 on the transmission box and adapted to engage the lug 20 and hold it against forward movement which is inoperative for gripping the drum, and it is held in this position while the shift goes from reverse to neutral, but is released when the rod 21 is moved forword to low gear by the pin 25 striking the U shaped loop 26 of the dog 22 and raises it out of engagement with the lug 20, allowing the coil to spring forward and grip the surface of the taper drum so that any backing movement in the direction of the arrow A will tend to wind up the coil and wrap it around tightly on the drum and hold it from turning, but any movement in the opposite direction will tend to unwind the coil and thus allowing free movement in that direction.

It is provided that any shift to forward speed will raise the dog 22 and put the coil in operative position.

The main shift rod 27 has a pin 28 which engages the loop 26 and raises the dog 22 on the forward shift to high speed, and the rod has a beveled portion 29 which engages a pin 30 on the dog 22 to raise it when the shift rod is moved back to engage second gear direct from neutral.

All the above operations are automatic on the movement of the gear shift, but a hand operated lever within reach of the driver could be provided for pushing back on the coil to make it inoperative and hold it in that position by a very slight modification, as shown in dotted lines in Figure 1 showing a bent rod 60 slidable in bearings 61, the end of the rod 62 being in position to push back on the end of spring 20 and release the coil from the drum 7. In Figure 3 a pivoted lever 63 is connected to a bar 64 having a hook 65 to engage the spring to release it. A suitable bearing bracket 66 is provided to guide the bar. 67 and 68 are the pivoted joints.

The complete operation is as follows:

The spring coil is in operative position when the vehicle is traveling in any forward speed, and is ready to prevent the vehicle from running backwards, but when it is desired to back up the reverse shift throws the coil out of operation and allows the vehicle to back freely. The coil is held in this position until one of the forward speeds are thrown in, that is low, second or high, when it is again thrown in operative position.

In the modified form shown in Figures 3 and 4, 35 indicates the transmission box, 36 the speedometer casing, 37 the main gear shaft and 38 the taper drum, the taper being reversed from that shown in Figure 1.

The coil spring 39 has the fixed end 40 adjustable on the threaded stud bolt 41 by means of the nuts 42 and 43, so that just the right pressure of the spring may be had on the taper drum face. In this form the reverse and low shift rod 44 acts when thrown in reverse on an arm 45 pivoted at 46 to pull back on a dog 47 which is hooked over a lug 48 of the spring, this acts to pull the coils back out of heavy contact with the drum and puts the coil in the inoperative position, and it is held in that position by a latch 49, pivoted at 50 on the transmission box.

This latch has an upwardly extending lug 51 which is adapted to be engaged by the pin 52 on the rod 44, or the pin 53 on the rod 54 on their forward movements.

On the lug 51 is an over hanging member 55 which the pin 53 engages and raises the latch on the back motion or second gear position of the rod.

The universal coupling 56 is bolted direct to the taper drum by bolts 57.

The operation is similar to the form shown in Figures 1 and 2, the difference being that the coil end has to be pulled back to throw it out of operation while the first described has to be pushed outward.

Having thus described our invention what we desire to secure by Letters Patent of the United States is as follows, but modifications may be made in carrying out the invention as shown in the drawings and in the above particularly described form thereof within the purview of the annexed claims.

We claim:

1. A reverse safety stop for motor vehicles comprising a taper drum, a coiled member around said drum, having one end adjustably fixed, the other end free, whereby the drum may run freely in one direction, but be held from rotation in the opposite direction by the action of said coiled member tending to wind up and wrap itself tightly on said drum, and means to hold said spring in inoperative position when it is desired that the drum run freely in either direction.

2. A reverse safety stop for motor vehicles, comprising the combination with a motor vehicle transmission, a main gear shaft projecting from said transmission, a taper face drum fixed on said shaft, a spiral spring coiled around said drum having one end adjustably fixed, the other end free, whereby when the shaft is rotated in one direction said spring will tend to wind up on said drum and hold it from further movement, when said shaft is rotated in the other direction the spring will tend to unwind and allow free movement of the drum, and means operated by the transmission mechanism to hold said spring in inoperative position when it is desired that the shaft run freely in either direction.

3. The combination with a gear shift transmission shaft, a drum having a taper face fixed on said shaft, a spiral spring having one end adjustably fixed and wound around and adapted to contact with said taper face, the other end of spring being free, means to control the free end and intermediate coils of said spring whereby said spring will grip the drum with force enough to prevent rotation in one direction, and light enough to allow it to rotate in either direction.

4. A safety stop for motor vehicles comprising in combination with a gear shift transmission, a shaft having its direction of motion controlled by said gear shift, a drum on said shaft, a spiral gripping member wound around said drum, one end of said member being adjustably fixed, the other end and coils free to wrap around and hold said drum from reverse motion, and means operated by the gear shift to prevent said coils from wrapping around and gripping the drum when it is desired to run in reverse, and means to automatically put the coils in operative position on any forward speed of said transmission.

5. A safety stop for motor vehicles comprising in combination with a transmission, a shaft operated by said transmission, a drum fixed on said shaft, a taper face on said drum, a spiral spring having one end adjustably fixed wound around on said taper face to allow free movement for the forward speeds of said transmission, but to prevent reverse movement by the automatic winding up of said coil, and means operated by said transmission to prevent the winding up of said coil when it is desired to go into reverse.

6. A safety stop for motor vehicles of the class described comprising in combination a transmission, a driven reversible shaft in said transmission, a taper member on said shaft, a spring having a tapered wire wound around said taper member, one end of said wire being adjustably fixed, and the other end and intermediate coils free to bear on said taper surface, whereby the rotation of said shaft will be free in one direction and be held from rotation in the reverse direction by the action of said spring winding up tight on said taper to grip and hold the shaft, and means acted on by the transmission mechanism to hold said spring in an inoperative position.

7. A reverse stop of the class described comprising a reversible rotatable member, a taper face member on said rotatable member, a gripping member having one end adjustably fixed, and the other end spirally wound around said taper face whereby said gripping member will tend to wind up and grip the taper face when the rotatable member is rotated in one direction, and to tend to unwind and allow said rotatable member to rotate freely in the other direction, and means acting on the free end of the gripping member to move said coils out of gripping contact with said taper face.

8. A reverse stop of the class described comprising a reversible rotatable member, a drum having a taper face on said member, a spiral spring having an inside tapering diameter adapted to fit said taper face, the outside diameter of said spring being the same for its full length, means to adjustably fix one end of said spring whereby the free coils of said spring will wind up tight on said taper face and hold it from further rotation when said rotatable member is rotated in one direction, and to tend to unwind and release said rotatable member when rotated in the opposite direction, automatic means, and hand operated means to release and hold said spring from gripping contact with said rotatable-member to allow said rotatable member to run freely in either direction.

In testimony whereof we have hereunto set our hands this 14th day of February, A. D. 1930.

MAX L. ROSENFELD.
JOHN H. MORGAN.